Figure 1:
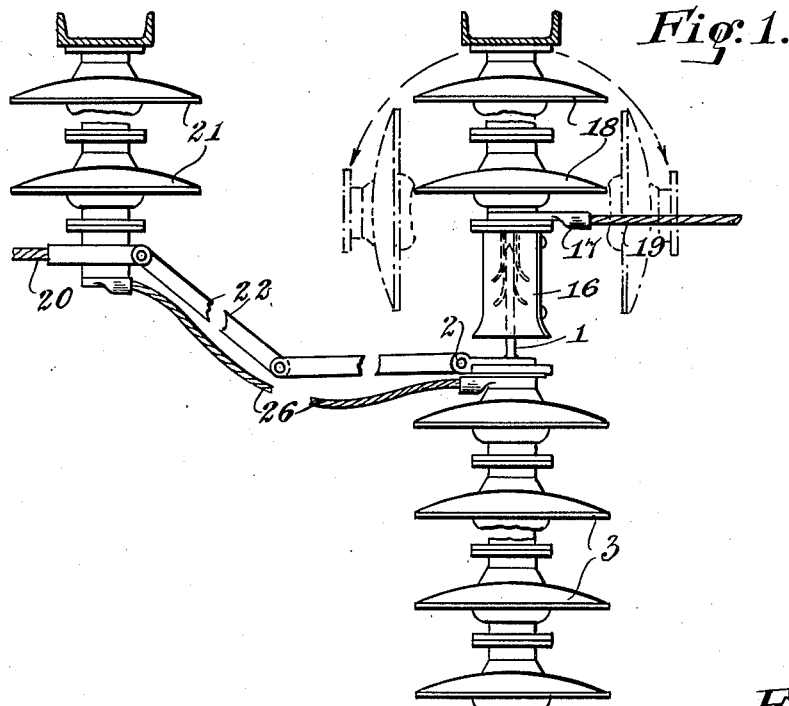

Nov. 9, 1926.

G. C. OXER 1,605,978

ELECTRICAL DISCONNECTER

Filed Dec. 14, 1922   3 Sheets-Sheet 1

Witnesses.

Inventor
George C. Oxer

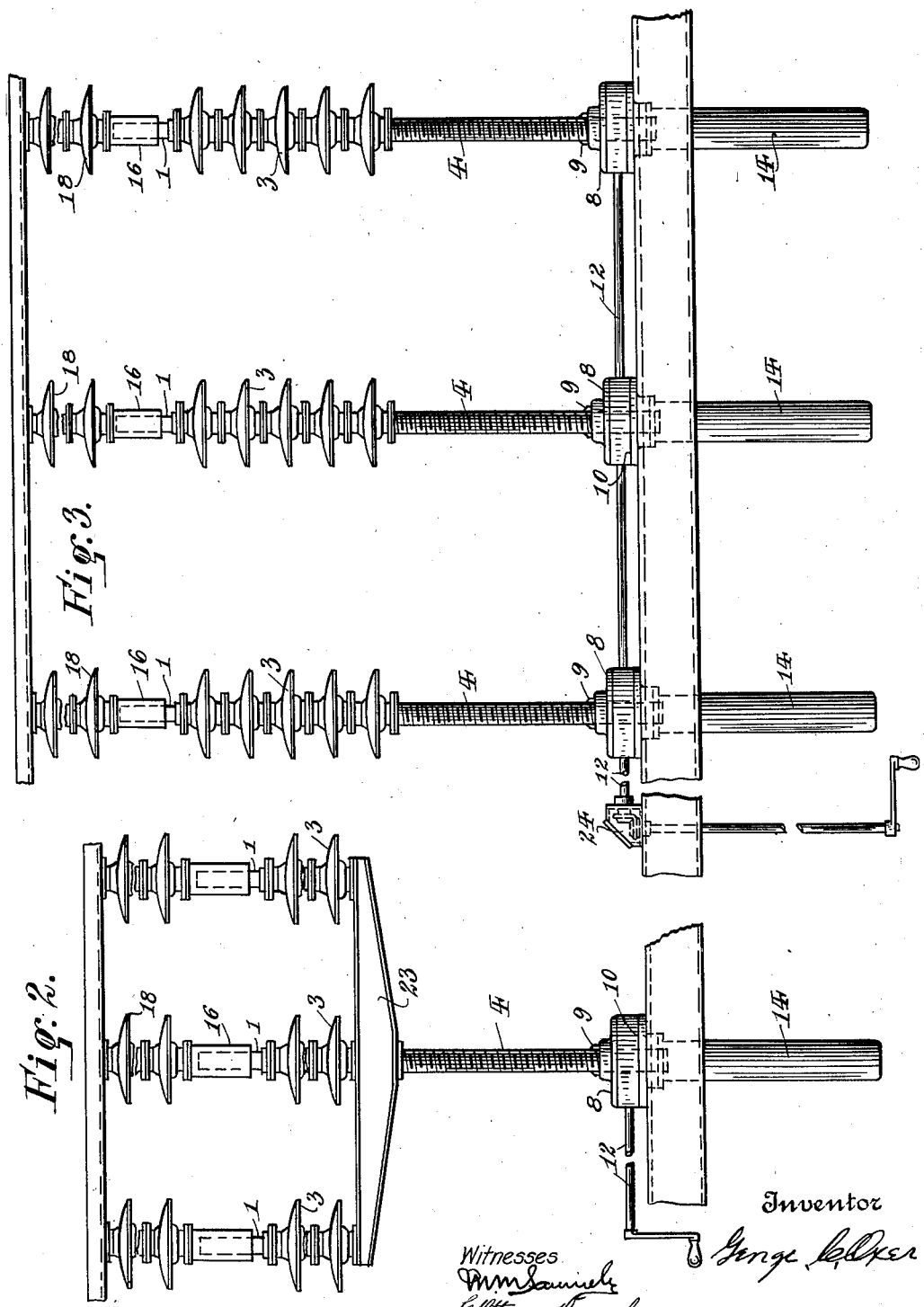

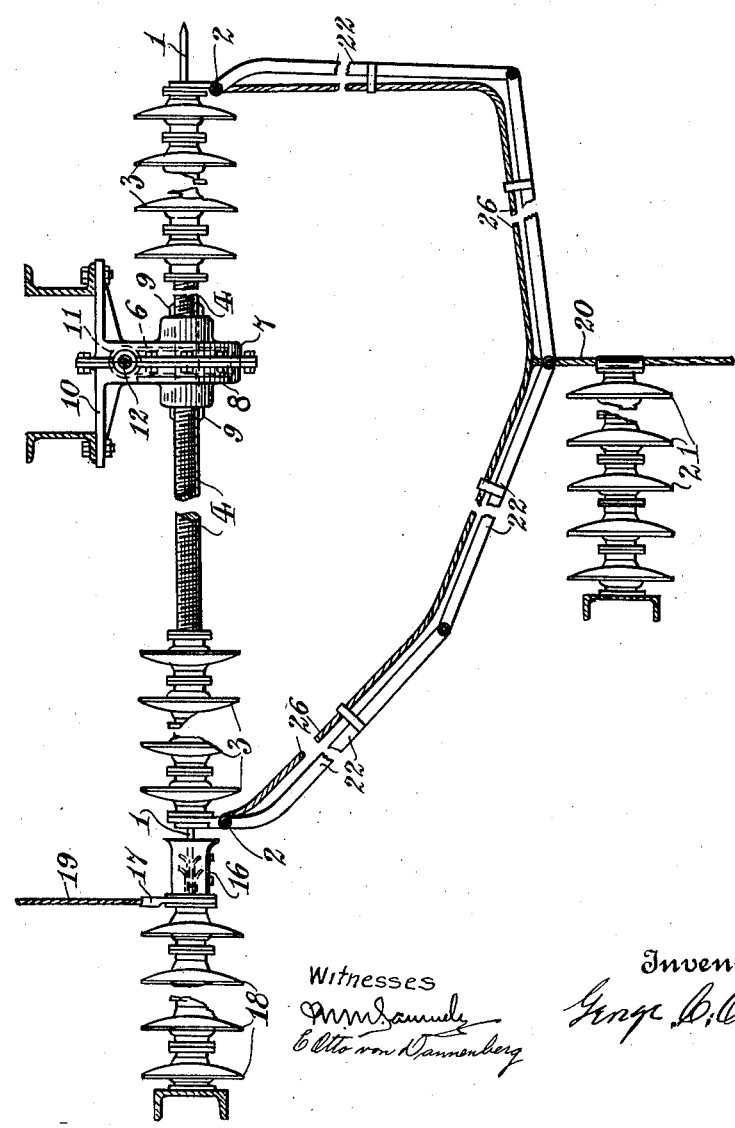

Patented Nov. 9, 1926.

1,605,978

UNITED STATES PATENT OFFICE.

GEORGE C. OXER, OF NEW YORK, N. Y.

ELECTRICAL DISCONNECTER.

Application filed December 14, 1922. Serial No. 606,982.

My invention relates to an improved form of electrical disconnecter, to be used for the purpose of mechanically disconnecting or connecting electrical conductors, more particularly when the circuit to be disconnected or connected is not carrying electrical current, as for example, where an oil circuit breaker is used to break the circuit under load, my disconnecter would thereafter disconnect the conductor at a second point, thereby isolating the oil circuit breaker from the energized conductor, or to disconnect or connect electrical conductors under any condition, when suitable contact members have been provided.

My new form of disconnecter is a single, self-contained propelling unit which may be mounted on a structure with its axis at any angle of from 90° to 270° relative to the axis of a fixed insulator element, and in this position, when combined with a fixed contact member mounted on a fixed insulator, be made to disconnect or connect an electrical circuit, when actuated either manually or mechanically.

It is adaptable to the operation of disconnecting or connecting two or more conductors simultaneously, in the case of low voltages, by mounting the two or more contact pieces together with their insulators on a common base which is supported and moved by the single self-contained element; or, to the operation, in the case of high voltages, of any number of single self-contained elements simultaneously when mounted with their axes parallel and in the same plane, as for example, three single self-contained units mounted on a structure with their axes parallel and in the same plane, together with their corresponding fixed insulators and contact elements, and a common actuating mechanism, would constitute a complete disconnecter for a high tension three phase circuit; or, to the disconnecting or connecting an electrical conductor from, or to, either of two other electrical conductors alternately, by mounting an insulator and contact member at, and attached to, each end of the propelling member of the single self-contained propelling unit, omitting the tail case, and joining the two contact members with the common conductor, so that they are of the same polarity, together with two fixed contact members suitably located, each connected to one of the two conductors from or to which the common conductor is to be disconnected or connected, thus forming a double throw disconnecter. It has special advantages when used on high voltage circuits, either exposed or unexposed to the weather, as well as on low voltage circuits, such as bus bars.

Numerous forms of disconnecters are known which may be operated singly or in a group, either manually or mechanically actuated, on high voltages and low voltages, but none of these have embodied a single self-contained propelling unit carrying a contact member, which can be mounted independently of the fixed insulator element and with its axes at various angles relative to the fixed insulator element. This particular disadvantage, and others, I have overcome in my disconnecter.

My invention will be best understood by referring to the accompanying drawing, which shows a preferred embodiment thereof, in which:—

Fig. 1 is an elevation of a single self-contained propelling unit and its corresponding fixed contact member and fixed insulator, together with a means for bringing the conductor up to the self-contained propelling unit. In this figure the insulators shown dotted, indicate the relative positions which the single self-contained propelling unit occupy, with respect to the fixed insulator, Fig. 2 is an elevation of the disconnecter showing the adaptation of one single self-contained propelling unit to the disconnecting, or connecting of three conductors simultaneously, as in the case of a low voltage three phase circuit, Fig. 3 shows a front elevation of three single self-contained propelling units, together with their corresponding fixed insulator and contact elements, to be operated in unison by a common operating mechanism, as employed in connection with a high voltage three phase circuit,

Figure 4:
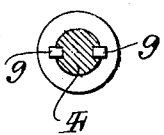
Figure 5:
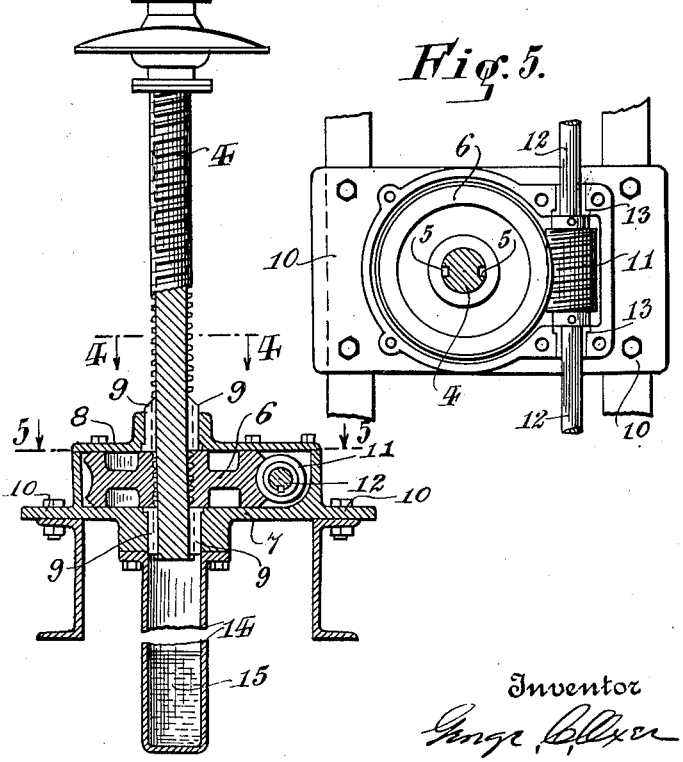

Fig. 4 is a cross section through the propelling member, taken at a point indicated by arrows in Fig. 1, Fig. 5 is a cross section through the metal case, taken at a point indicated by arrows, in Fig. 1, Fig. 6 shows a side elevation of a single self-contained propelling unit, together with the corresponding fixed contact members, fixed insulators, and jointed links for conveying and guiding the common conductor to the two movable contact members, as employed in a double throw disconnecter.

Similar numerals refer to similar parts throughout.

As shown in the drawing a movable contact member 1 consisting of a bar, tube or rod of metal, together with a metal terminal and hinge member 2, is mounted on a movable insulator 3.

The movable insulator 3 is in turn mounted at one end of a rigid translating member 4, consisting of a metal rod or tube, having formed on the exterior surface a pitched thread, and two keyways 5, said keyways 5 being formed parallel to the axis of, and on opposite sides of the translating member 4. A spur, bevel, or worm gear 6, equipped at the center with a thread of the same pitch as, and engaging with the thread on translating member 4, is supported by the metal case 7, and the attached metal cover 8, through which the translating member 4 passes, with its axis at right angles to the planes of the gear 6 and metal case 7. Metal case 7 and attached cover 8 each, carries rigidly attached thereto, at the central opening through which translating member 4 passes, two metal keys 9, which engage with the keyways 5 in translating member 4, thus permitting longitudinal motion, but preventing rotation in translating member 4, when gear 6 is rotated. Metal case 7 is constructed with flanges 10 for the purpose of mounting the complete mechanism rigidly to any suitable structure. Gear 6 is caused to rotate, thus imparting a longitudinal motion to translating member 4, by the gear 11, with which it meshes, and which is likewise contained within metal case 7. Gear 11 is attached rigidly to shaft 12, which passes through metal case 7, and by means of bearings 13, both gear 11 and shaft 12, are held firmly in place and allowed to rotate freely. Power for actuating the mechanism is applied to shaft 12, either manually or mechanically. The tail case 14, being a metal tube of slightly larger internal diameter than the external diameter of translating member 4, closed at one end, and provided with a flange at the other end for attaching to metal case 7, carries within it the lubricating material 15, thus assuring automatic lubrication, at all times, as well as complete protection from snow and ice, of the translating member 4, when the disconnecter is in the open position.

In order to effect the disconnecting or connecting of the conductor, a contact member 16, composed of a weather proof case containing therein two parallel pieces of spring metal, which engage firmly the contact member, when the disconnecter is in the closed position or any other suitable form of contact for engaging contact member 1, is mounted, together with the terminal 17, on fixed insulator 18, which in turn is rigidly mounted on any suitable structure. Contact member 16 must in all cases be mounted with its longitudinal axis in line with the longitudinal axis of contact member 1, irrespective of the angle at which the axis of the translating member 4, subtends with the axis of fixed insulator 18.

Line conductor 19 is securely attached to terminal 17. Since conductor 20 is attached firmly to terminal 2, through flexible cable 26, and the line insulator support 21 is so located on a structure that the sag in flexible cable 26, from support 21 to terminal 2, is sufficient to furnish the additional length required when the disconnecter is in the open position; or, support 21 can be located so that a jointed link 22 may be utilized to take up the additional length required in flexible cable 26, thus preventing lateral motion relative to the plane of conductor 20 and axis of insulator 21.

When desirable, two or more conductors can be disconnected or connected simultaneously by the action of a single translating member 4 (see Fig. 2), together with the accompanying mechanism heretofore described, and translating member 4 having mounted thereon a common base 23, upon which in turn the two or more movable insulators 3 are mounted. The contact members 1 and the contact members 16 in this case being designed to meet the actual mechanical requirements.

When desirable as shown in Fig. 3, two or more conductors can be disconnected or connected simultaneously by the action of two or more of the single self-contained propelling disconnecter units heretofore described, mounted with their axes parallel and in the same plane, all of the gears 11 being rigidly connected by the common shaft 12. The accompanying contact member 16, terminals 17, and fixed insulators 18 are mounted on a suitable structure. Power for operating such a plurality of disconnecter units is transmitted to shaft 12 by means of a suitable mechanism 24, and may be either manual or mechanical.

When desirable as shown in Fig. 6, a single conductor can be alternately disconnected from or connected to one of two other conductors, by, omitting tail case 14 and its lubricating material 15 from the single self-contained propelling unit, and attaching to the end of propelling member 4, a second movable insulator 3, having mounted thereon a movable contact member 1 and terminal and hinge member 2, the two terminal and hinge members 2 being joined together electrically by the flexible cable 26, the flexible cable 26 being supported and held in a plane by the two jointed links 22 and securely connected to the conductor 20, the single self-contained propelling double throw unit, mounted securely to a suitable structure, together with two corresponding fixed contact members 16, terminals 17, fixed insulators 18, and fixed insulator 21, and a suitable means for transmitting power to driving shaft 12. Propelling member 4 when actuated by propelling gear 6, moves forward or backward as the case may be, thus alternately disconnecting or connecting conductor 20 from, or to, the conductor 19 or conductor 25.

The advantages of my disconnecter are, that the movable contact member or contact members, the movable insulator or movable insulators, and the accompanying propelling mechanism combined forms a compact self-contained unit, which can be mounted with its longitudinal axis at any angle of from 90° to 270°, measured from the axis of the fixed insulator; or, when two or more such self-contained units are operated in unison, and mounted with their longitudinal axes parallel and in the same plane, such a plurality of units can be mounted with the common plane at any angle of from 90° to 270°, measured from the axis of the fixed insulator; that two or more conductors can be disconnected or connected simultaneously by a single self-contained disconnecter unit; that the lubrication of the moving parts is automatic; that the moving parts are so protected from snow and ice that under the severest weather conditions its successful operation will be assured; that it can be employed in connection with the highest voltages without undue strains or mechanical weaknesses; that its action is positive when actuated either by manual or mechanical means; that it will withstand magnetic stresses due to heavy current flow, and that the circuit will not be disconnected through the action of magnetic forces due to heavy flow of current; that it can be utilized either as a single throw or a double throw disconnecter.

It is evident that my invention may be constructed in many other forms than that shown and described, and I, therefore, do not wish to be restricted by the particular form herein shown, but, intend my claims to cover a mechanism constructed in accordance with the best mechanical practice of the time, and within the spirit and scope of my invention.

I claim:

1. In an electric switch, the combination of a stationary contact mounted on an independent insulating support and provided with means for connecting a line electrically thereto, a rod-like propelling arm, an insulator carried on the end of the arm, a contact on the insulator adapted to cooperate with the first contact, the insulator and its contact being arranged substantially in axial alignment with the stationary contact, means for connecting a line to the contact on the insulator, and means engaging the arm for positively reciprocating it in the direction of its longitudinal axis to bring the contacts into and out of engagement.

2. In an electric switch, a stationary contact mounted on an independent insulating support and provided with means for connecting a line electrically thereto, a propelling arm, an insulator carried by the arm, a contact mounted on the insulator and adapted to cooperate with the first contact, the insulator and its contact being disposed substantially co-axially of said stationary contact, means for connecting a line to said contact, a housing having apertures through which the arm extends, and means in the housing engaging the arm for reciprocating the latter longitudinally.

3. In an electric switch, a stationary contact mounted on an independent insulating support and provided with means for electrically connecting a line thereto, a propelling arm movable longitudinally, an insulator carried by the arm, the arm and the insulator lying co-axially with the stationary contact, a contact carried by the insulator and adapted to cooperate with the stationary contact, means on the insulator for connecting a line electrically to the contact thereon, and means for reciprocating the arm longitudinally to bring the contacts into and out of engagement.

4. In an electric switch, a stationary contact mounted on an independent insulating support and provided with means for connecting a line thereto, a propelling arm having a screw thread formed on its surface, an insulator carried by the arm, a contact mounted on the insulator and adapted to cooperate with the first contact, the insulator, and the contact carried thereby lying substantially co-axially with relation to the stationary contact, a housing having apertures through which the arm extends, and means for reciprocating the arm in the direction of its axis to open and close the contacts including a gear located within the housing adjacent the arm, and having portions engaging the thread on the arm.

5. In an electric switch, a stationary contact mounted on an independent insulating support and provided with means for connecting a line thereto, a propelling arm, an insulator carried by the arm, a contact mounted on the insulator and adapted to cooperate with the first contact means on the insulator for connecting a line electrically to the contact thereon, the insulator, and its contact lying substantially co-axially with relation to the stationary contact, a housing having apertures through which the arm extends, and means in the housing for supporting the arm and operable to reciprocate it in the direction of its axis to open and close the contacts, this means also serving to lock the arm in position.

6. In an electric switch, a stationary contact mounted on an independent insulating support, a propelling arm having a screw thread formed on its surface, an insulator carried by the arm, a contact mounted on the insulator and adapted to cooperate with the first contact the insulator, and the contact thereon lying substantially co-axially with relation to the stationary contact, a housing having apertures through which the arm extends, a gear within the housing adjacent the arm and having portions engaging the thread thereon, the gear being held against axial movement by the walls of the housing, and means operable from the exterior of the housing to rotate the gear and thus reciprocate the arm in the direction of its axis to open and close the contacts.

7. In an electric switch, a plurality of stationary contacts mounted on independent insulating supports, a propelling arm, a base carried by the arm, a plurality of insulators on the base the axes of these insulators lying parallel to the axis of the arm, a contact on each insulator adapted to cooperate with one of the stationary contacts each of the insulator contacts being arranged co-axially with relation to its insulator, and also with its associated stationary contact, and means for reciprocating the arm in the direction of its axis to open and close the contacts.

8. In an electric switch, a plurality of stationary contacts mounted on independent insulating supports, a propelling arm, a base carried by the arm, a plurality of insulators on the base the axis of each insulator being parallel to the axis of the arm, a contact on each insulator adapted to cooperate with one of the stationary contacts each of these insulator contacts having its axis parallel to the axis of the arm and in alignment with the axis of its associated stationary contact, a housing having apertures through which the arm extends, and means in the housing for reciprocating the arm in the direction of its axis to open and close the contacts.

9. In an electric switch, a stationary contact mounted on an independent insulating support, forming one terminal of a line, a propelling arm having a screw thread formed on its surface, an insulator carried by said arm, a contact carried on said insulator the insulator and the contact being co-axial and in alignment with the stationary contact, and also having their axes parallel to the axis of the arm, a line terminal mounted on an insulating support and connected to the contact on the insulator by a flexible cable, a jointed link connecting the terminal to the contact and connected to the flexible cable, and means including a gear adjacent the arm and having portions engaging the thread for reciprocating the arm in the direction of its axis to open and close the contacts.

10. In an electric switch, a stationary contact mounted on an independent insulating support, forming one terminal of a line, a propelling arm, an insulator carried by said arm, a contact carried on said insulator the insulator and its contact being co-axial and in alignment with the stationary contact, the axis of the insulator and contact also being parallel to the axis of the propelling arm, a line terminal mounted on an insulating support and connected to the contact on the insulator by a flexible cable, a jointed link connecting the terminal to the contact and connected to the flexible cable, a housing having apertures through which the arm extends, and means in the housing for reciprocating the arm in the direction of its axis to open and close the contacts.

11. In an electric switch, a pair of contacts mounted in spaced relation on insulating supports, a propelling arm, insulators carried by the arm, contacts carried by the insulators co-axially therewith, each of these contacts being in alignment and adapted to cooperate with one of the stationary contacts, a support for the arm, and means for reciprocating the arm longitudinally to bring one or the other of the contacts carried thereby into engagement with a stationary contact.

12. In a electric switch, a pair of stationary contacts mounted in spaced relation on insulating supports, a housing supported between the contacts and having apertures formed in opposite sides thereof, a propelling arm extending through the apertures in the housing, an insulator carried by the arm on either side of the housing, a contact carried on each insulator, and means located in the housing operable to reciprocate the arm axially in either direction to bring one or the other of the contacts mounted on the arm into operative relation with a stationary contact.

13. In an electric switch, a pair of stationary contacts mounted in spaced relation on insulating supports, an axially reciprocable propelling arm supported between the contacts, insulators carried on said arm at either side of said support, contacts carried by said insulators, and means for moving the arm to bring either of its contacts into operative connection with a stationary contact.

14. In an electric switch, a pair of stationary contacts mounted in spaced relation on insulating supports, a housing supported between the contacts and having apertures formed in opposite sides thereof, a propelling arm extending through the apertures in the housing, an insulated contact carried by the arm on either side of the housing, means within the housing operable to reciprocate the arm axially in either direction to bring one or the other of the contacts mounted upon it into operative relation with a stationary contact, and means mounted on the housing for preventing the rotation of the arm in its axial movement and also serving to remove ice and sleet from the surface of the arm.

15. In an electric switch, a pair of stationary contacts mounted in spaced relation on insulating supports, a housing mounted between the contacts and having apertures formed in opposite sides thereof, a propelling arm extending through the apertures in the housing and having longitudinal keyways formed in its surface, an insulated contact carried by the arm on either side of the housing, means located within the housing operable to reciprocate the arm axially in either direction to bring one or the other of the contacts mounted upon it into operative relation with a stationary contact, and keys mounted on the housing and entering the keyways, these keys serving to prevent the rotation of the arm in its axial movement and also having portions which serve to remove ice and sleet from the arm as it is moved.

16. In an electric switch, a pair of stationary contacts mounted on insulating supports in spaced relation and connected to line terminals, an axially reciprocable arm supported between the contacts, an insulator carried by the arm on either side of its support, a contact mounted on each insulator, a line terminal connected to each contact on the arm, and means for moving the arm in the direction of its axis to bring one or the other of its contacts into engagement with a stationary contact.

17. In an electric switch, a pair of stationary contacts mounted on insulating supports in spaced relation and connected to line terminals, an axially reciprocable arm supported between the contacts, an insulator carried by the arm on either side of its support, a contact mounted on each insulator, a line terminal mounted on an insulating support and connected by flexible cables to the contacts on the arm, a jointed link connected between the line terminal and each contact on the arm and having loose connections with the cable associated with it, and means for moving the arm to bring one or the other of its contacts into engagement with a stationary contact.

18. In an electric switch, a pair of stationary contacts mounted in spaced relation on insulating supports, each contact having a terminal for a line, a support disposed between the stationary contacts, a propelling arm axially reciprocable through the support and having insulators carried on either side of said support, a contact carried by each insulator, a stationary line terminal carried by an insulator electrically and mechanically connected to the contacts on the arm, the electrical and mechanical connections being in turn loosely connected together, and means for moving the arm through the support to bring one or the other of its contacts into operative engagement with a stationary contact.

19. In an electric switch a pair of stationary contacts, a housing mounted between the contacts and having apertures in its walls, a propelling arm extending through the apertures, an insulator on the arm on either side of the housing, a contact on each insulator adapted to cooperate with one of the stationary contacts, means in the housing for supporting and moving the arm through the housing to bring one or the other of its contacts into operative engagement with a stationary contact, and means operable from without the housing to actuate the moving means.

20. In an electric switch, a stationary contact mounted on an insulating support, a propelling arm, an insulator carried by this arm, a contact mounted on the insulator adapted to cooperate with the stationary contact, a housing having apertures through which the arm extends, means in the housing for supporting and moving the arm therethrough to open and close the contacts, and means carried by the housing at the apertures and engaging the arm beyond the housing for removing ice and sleet from the arm as the latter moves through the housing.

21. In an electric switch, a stationary contact mounted on an insulating support, a propelling arm, an insulator carried by this arm, a contact mounted on the insulator adapted to cooperate with the stationary contact, a housing having apertures through which the arm extends, means in the housing for supporting and moving the arm therethrough to open and close the contacts, and a pointed key mounted in the housing and extending therebeyond, this key engaging the arm and adapted to remove ice and sleet from the surface of the arm as the latter moves through the housing.

In testimony whereof I affix my signature.

GEORGE C. OXER.